(12) United States Patent
Koran et al.

(10) Patent No.: US 7,581,193 B2
(45) Date of Patent: Aug. 25, 2009

(54) SYSTEM AND METHOD FOR FACILITATING INTERACTIVE SELECTION AND PRESENTATION OF DATASETS

(75) Inventors: Joshua M. Koran, Mountain View, CA (US); Glen Anthony Ames, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 282 days.

(21) Appl. No.: 11/640,033

(22) Filed: Dec. 15, 2006

(65) Prior Publication Data

US 2008/0148168 A1 Jun. 19, 2008

(51) Int. Cl.
*G06F 13/00* (2006.01)
*G06F 15/00* (2006.01)

(52) U.S. Cl. ................................ 715/804; 715/805
(58) Field of Classification Search .................. 715/723, 715/771, 748, 722, 817, 853, 840, 804–805; 345/629, 639
See application file for complete search history.

(56) References Cited

U.S. PATENT DOCUMENTS

2002/0105532 A1* 8/2002 Oblinger ..................... 345/701
2006/0123340 A1* 6/2006 Bailey et al. ................ 715/700

* cited by examiner

*Primary Examiner*—Kevin Nguyen
(74) *Attorney, Agent, or Firm*—Stattler-Suh PC (57) ABSTRACT

A system and method to facilitate interactive selection and presentation of datasets are described. An interactive data interface is presented to a user in a display window, said interactive data interface containing distribution of a dataset accessed by the user. A minimum range value and a maximum range value corresponding to a data range within the dataset are received, the range values being input by the user into one or more interactive areas within the data interface. Finally, display of data within the data range is further facilitated within an overlay area of the data interface disposed over the distribution of the dataset.

18 Claims, 7 Drawing Sheets

SYSTEM AND METHOD FOR FACILITATING INTERACTIVE SELECTION AND PRESENTATION OF DATASETS

TECHNICAL FIELD

The present invention relates generally to computer applications and, more particularly, to a system and method to facilitate interactive selection and presentation of datasets.

BACKGROUND OF THE INVENTION

The explosive growth of the Internet as a publication and interactive communication platform has created an electronic environment that is changing the way business is transacted. As the Internet becomes increasingly accessible around the world, visitors, such as, for example, consumers and/or customers, need efficient tools to navigate the Internet and to find content available on various websites.

Internet entities, such as, for example, portals provide visitors an entrance and guide into the vast resources of the Internet, such as, for example, a range of search, email, news, shopping, chat, maps, finance, entertainment, and other content and services. In addition, users may connect to the portals either directly or through a network, such as the Internet, to access specific applications designed to enable interactive selection and presentation of datasets to improve a user's return on advertising spending, for example.

Many applications require users to input ranges of a continuous or ordinal variable, such as, for example, data ranges. Such applications fail to provide an interactive visualization of a percentage of the dataset selected by the user-entered data ranges and also fail to show the relationship of the selection to the distribution of the dataset. For example, should a user select a range of numeric values, it is difficult to know what percentage of all records in a data set falls within that selection. Thus, what is needed is a system and method to facilitate interactive selection of non-discrete data ranges and presentation of dataset results for the users.

SUMMARY OF THE INVENTION

A system and method to facilitate interactive selection and presentation of datasets are described. An interactive data interface is presented to a user in a display window, said interactive data interface containing distribution of a dataset accessed by the user. A minimum range value and a maximum range value corresponding to a data range within the dataset are received, the range values being input by the user into one or more interactive areas within the data interface. Finally, display of data within the data range is further facilitated within an overlay area of the data interface disposed over the distribution of the dataset.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

The field of descriptive statistics enables the compact representation of data by describing key metrics about an underlying dataset. The most common statistical measures include minimum, upper quartile, lower quartile, mean, median, and maximum measures of the dataset. These numbers can describe the skewness of a histogram, which displays the frequency of records at any given point along a continuous or ordinal range of data. A more compact representation of the histogram is a box-plot (also called a box-and-whisker plot). The box-plot represents where the middle 50% percent of the data by frequency lies on an ordinal scale. The boundaries of this box are thus the upper and lower quartiles. The median and mean of the box-plot are represented by either lines or dots. The minimum and maximum outliers of the data set are represented by lines parallel to the short sides of the box. These outliers are connected to the box by perpendicular lines. Since these outliers and their connection lines look like whiskers of the box, this gives the chart the name the box-and-whisker plot.

While descriptive statistics represent data in a compact form, many users may want to understand how many rows of the data fall within user-defined selection ranges. For example, if the data were birthdates, a user might want to know how many people in the dataset had birthdates between 1970 and 1980. This selection acts as a filter of the original dataset. The user wishes to understand both the frequency of rows in the selection and the comparison of this parameter to the underlying frequencies of the dataset, namely what proportion of the entire dataset is selected by the user-defined ranges.

By simultaneously displaying the original distribution of the dataset and the portion of the dataset that the user has selected, the user will be able to choose ideal ranges of the dataset to select. The user entry can be by means of entering the range of the selection into textboxes or by dragging minimum and maximum extents of an overlay on top of the distribution of the dataset.

Once the user has identified the range filter, this input may be used to filter the rows of the original data set to create a new dataset or to perform analysis solely on the rows that fall within the dataset range.

Figure 1:
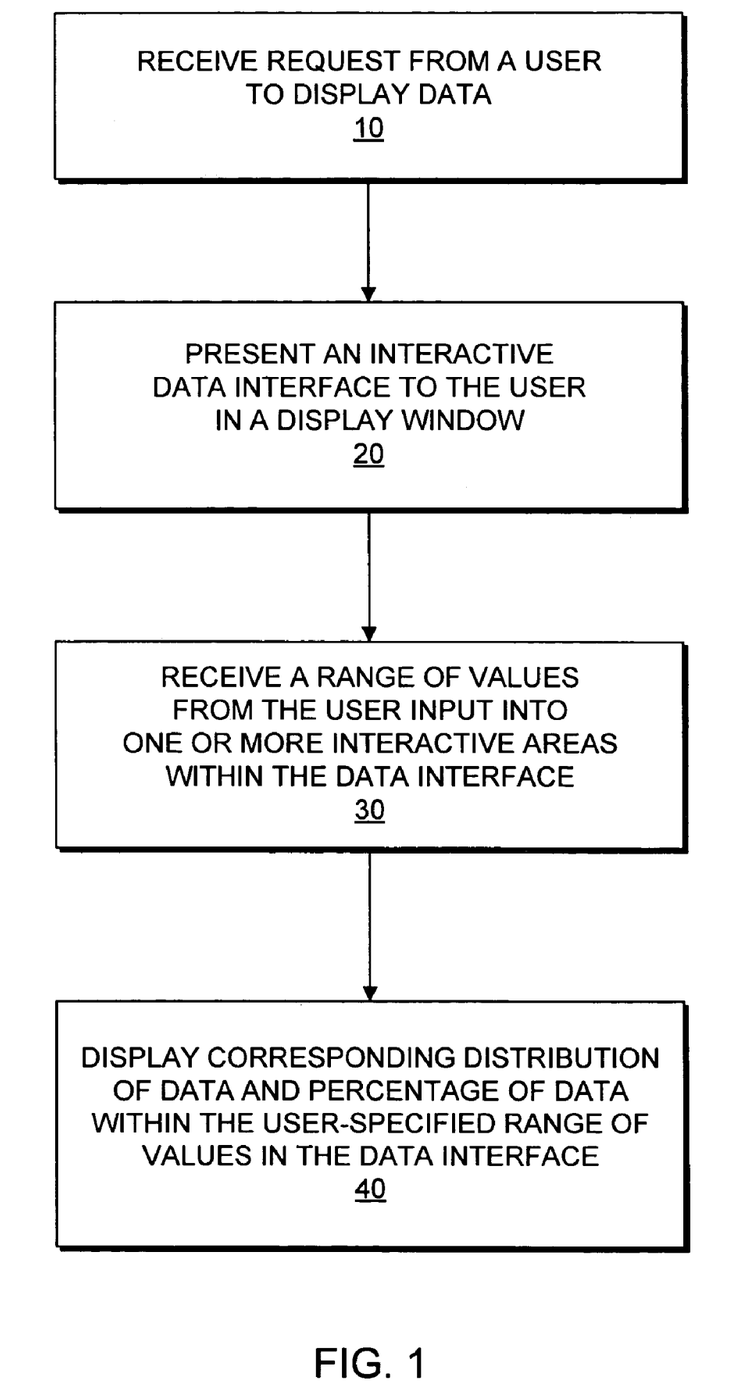
FIG. 1 is a flow diagram illustrating a processing sequence to facilitate interactive selection and presentation of datasets, according to one embodiment of the invention.

FIG. 1 is a flow diagram illustrating a processing sequence to facilitate interactive selection and presentation of datasets. As shown in FIG. 1, at processing block 10, the sequence starts with receipt of a request to display data. In one embodiment, a user connects to an entity and transmits a request to display data, as described in further detail below. Alternatively, the user may connect to the entity via a network to transmit the request to display data.

Next, at processing block 20, an interactive data interface is presented to the user in a display window. In one embodiment, the entity receives the user request and displays an interactive data interface in a display window of a client machine connected to the user, as described in further detail below.

At processing block 30, a range of values input into one or more interactive areas within the data interface is received from the user. In one embodiment, the user inputs a range of values into one or more interactive areas of the data interface and transmits the values to the entity, as described in further detail below.

Finally, the sequence continues at processing block 40 with a display of corresponding distribution of data and percentage of requested data within the user-specified range of values within the data interface, as described in further detail below.

Figure 2:
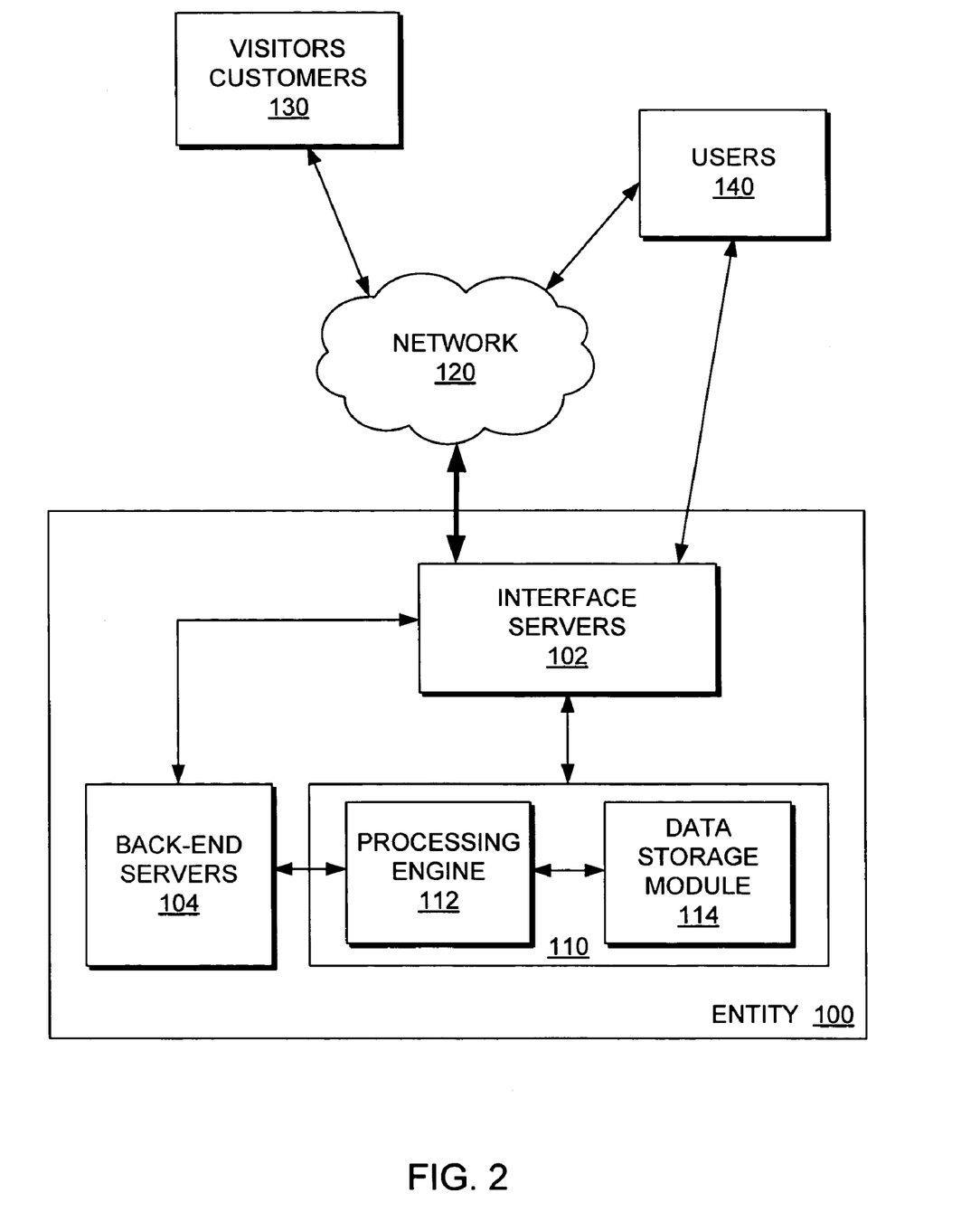
FIG. 2 is a block diagram illustrating an exemplary network-based entity containing a system to facilitate interactive selection and presentation of datasets, according to one embodiment of the invention.

FIG. 2 is a block diagram illustrating an exemplary network-based entity containing a system to facilitate interactive selection and presentation of datasets. While an exemplary embodiment of the present invention is described within the context of an entity 100 enabling such selection and presentation of datasets, it will be appreciated by those skilled in the art that the invention will find application in many different types of computer-based, and network-based, entities, such as, for example, commerce entities, content provider entities, or other known entities communicating directly with users or having a presence on the network.

In one embodiment, the entity 100, such as, for example, an Internet portal, includes one or more front-end interface servers 102, which may, for example, deliver web pages to multiple visitors or customers 130, (e.g., markup language documents), handle search requests to the entity 100, provide automated communications to/from visitors/customers 130 of the entity 100, deliver images to be displayed within the web pages, deliver content information to the visitors/customers 130. In one embodiment, the front-end interface servers 102 are further configured to provide interface capabilities to one or more users 140, such as, for example, marketers or other users of applications residing within the entity 100, and to enable such users 140 to communicate with the entity 100, either directly or through a network 120. Alternatively, the entity 100 may include a number of additional front-end servers (not shown), which provide an intelligent interface to the back-end of the entity 100.

In one embodiment, the entity 100 further includes one or more back-end servers 104 coupled to the front-end interface servers 102, such as, for example, processing servers, data storage servers, advertising servers, and other known servers, and a system 110 to facilitate interactive selection and presentation of datasets, as described in further detail below, the system 110 being coupled to the front-end interface servers 102 and the back-end servers 104.

In one embodiment, the system 110 further includes a processing engine 112 coupled to a data storage module 114. The processing engine 112 may include software and/or hardware modules configured to perform selection and presentation operations, as described in further detail below. The data storage module 114, which at least partially implements and supports the system 110, may include one or more storage facilities, such as a database or collection of databases, which may be implemented as relational databases. Alternatively, the data storage module 114 may be implemented as a collection of objects in an object-oriented database, as a distributed database, or any other such databases.

In one embodiment, the visitors/customers 130 and the users 140 may access the network-based entity 100 directly through a client machine (not shown) coupled to the visitors/customers 130 and the users 140 or, in the alternative, through a client program, such as a browser (e.g., the Internet Explorer browser distributed by Microsoft Corporation of Redmond, Wash.), that executes on the client machine and accesses the facility 100 via the network 120, such as, for example, the Internet. Other examples of networks that a client may utilize to access the entity 100 includes a wide area network (WAN), a local area network (LAN), a wireless network (e.g., a cellular network), the Plain Old Telephone Service (POTS) network, or other known networks.

Figure 3:
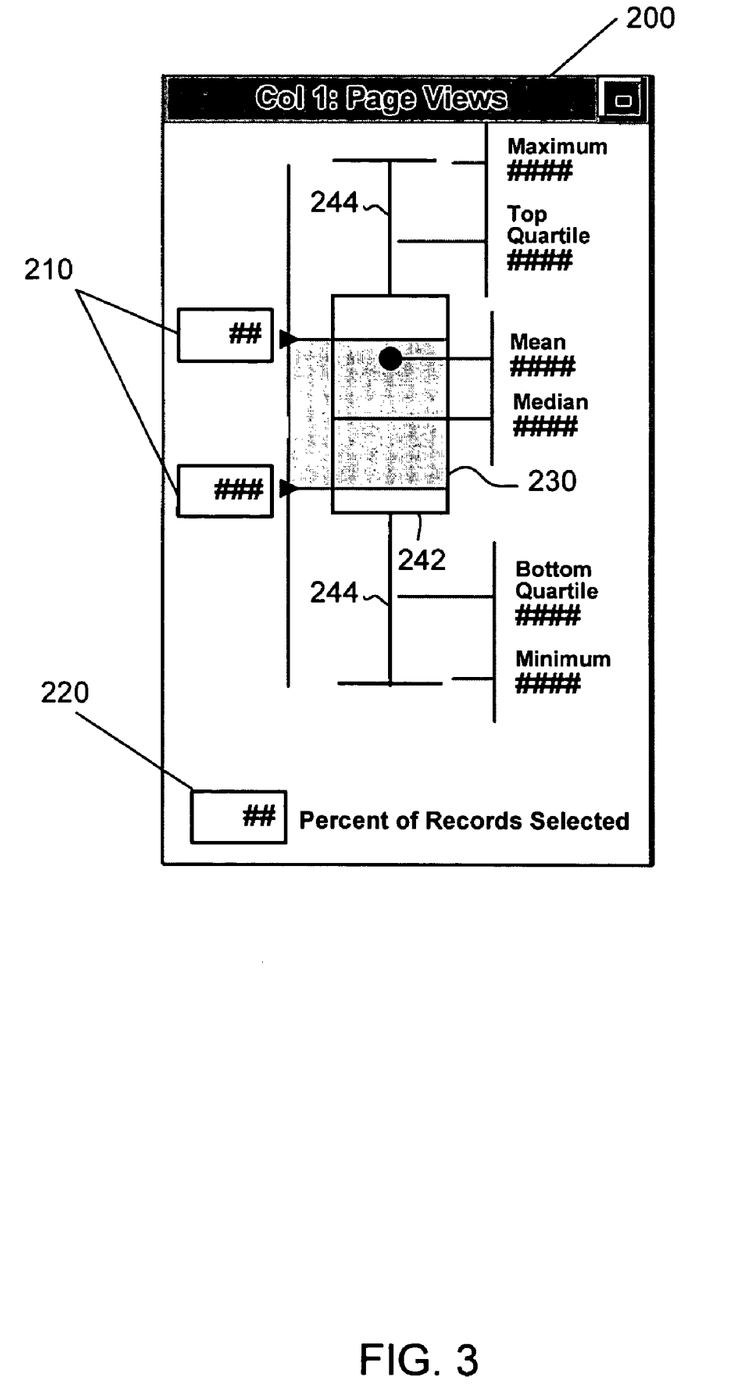
FIG. 3 is an exemplary illustration of an interactive data interface to facilitate interactive selection and presentation of datasets, according to one embodiment of the invention.

FIG. 3 is an exemplary illustration of an interactive data interface to facilitate interactive selection and presentation of datasets. As shown in FIG. 3, in one embodiment, the interactive data interface 200 includes multiple interactive entry boxes 210, an interactive results area 220, an interactive overlay area 230, for example a transparent overlay area, and a box plot area 240.

The box plot area 240 incorporates distribution of data based on robust statistics, which are more resistant to outlier values than classical statistics based on normal data distribution. The box plot area 240 includes a box area 242 and two whisker areas 244, as described in detail below.

If, for example, a set of results contains a series of values such as 2, 3, 2, 4, 3, 4, 3, the mean value of these data is equal to 3. If an outlier value is present, due to an error in measurement or some other parameter variation, the sequence of values may be illustrated as: 2, 3, 2, 4, 3, 11, 3. Thus, the calculated mean value of the data is now 4, which is no longer representative for the central tendency of the dataset. In robust statistics, the mean value may be replaced by a median value, which may be calculated as the middle observation in a ranked series of data, if the number of values is odd, or may be calculated as the mean value of two middle observations, if the number of values is even. In the example above showing the 2, 3, 2, 4, 3, 4, 3 series of values, the median value is equal to 3. Similarly, looking at the second example, 2, 3, 2, 4, 3, 11, 3, the median value is also equal to 3 and, thus, it is not affected by the outlier value 11.

In addition to the calculated median and mean values, the interquartile range describes the distribution of data. The interquartile range is the range within which the middle 50% of the ranked data are found. This is also the range between a bottom quartile value and a top quartile value, which are also shown in the box plot area 240, in addition to the mean and median values.

In one embodiment, the mean value, the median value, and the interquartile range of values are used to illustrate the box area 242. The box 242 has a height equal to the interquartile range value and is drawn within the data interface 200 to encompass the mean value and the median value. The whiskers 244 indicate the full range of data and are represented as vertical lines, each ending in a small horizontal line, which respectively indicates a maximum value and a minimum value of the data.

As illustrated in FIG. 3, in one embodiment, the interactive entry boxes 210 within the data interface 200 facilitate input of a numeric minimum range value and a numeric maximum range value representing respective indicators of a data range requested by users 140 directly or, in the alternative, over the network 120. The interactive entry boxes 210 represent visual lower and upper boundaries or edges of the interactive transparent overlay area 230, which encompasses the data range requested by the users 140. In one embodiment, users 140 may modify the boundaries of the interactive overlay area 230 by sliding the lower and upper edges corresponding to the respective minimum and maximum range values and, thus, capturing a bigger or smaller data range. Alternatively, the users 140 may slide the overlay area 230 without modifying its boundaries to capture a different data range containing the same percentage of data.

Referring back to FIG. 3, in one embodiment, the interactive results area 220 displays the percentage of data selected and contained within the overlay area 230, between the minimum and maximum range values shown in the numeric entry boxes 210. The results area 220 may be modified in realtime to show current percentage results, in response to modifications input by the users 140 within the respective areas of the data interface 200.

Figure 4:
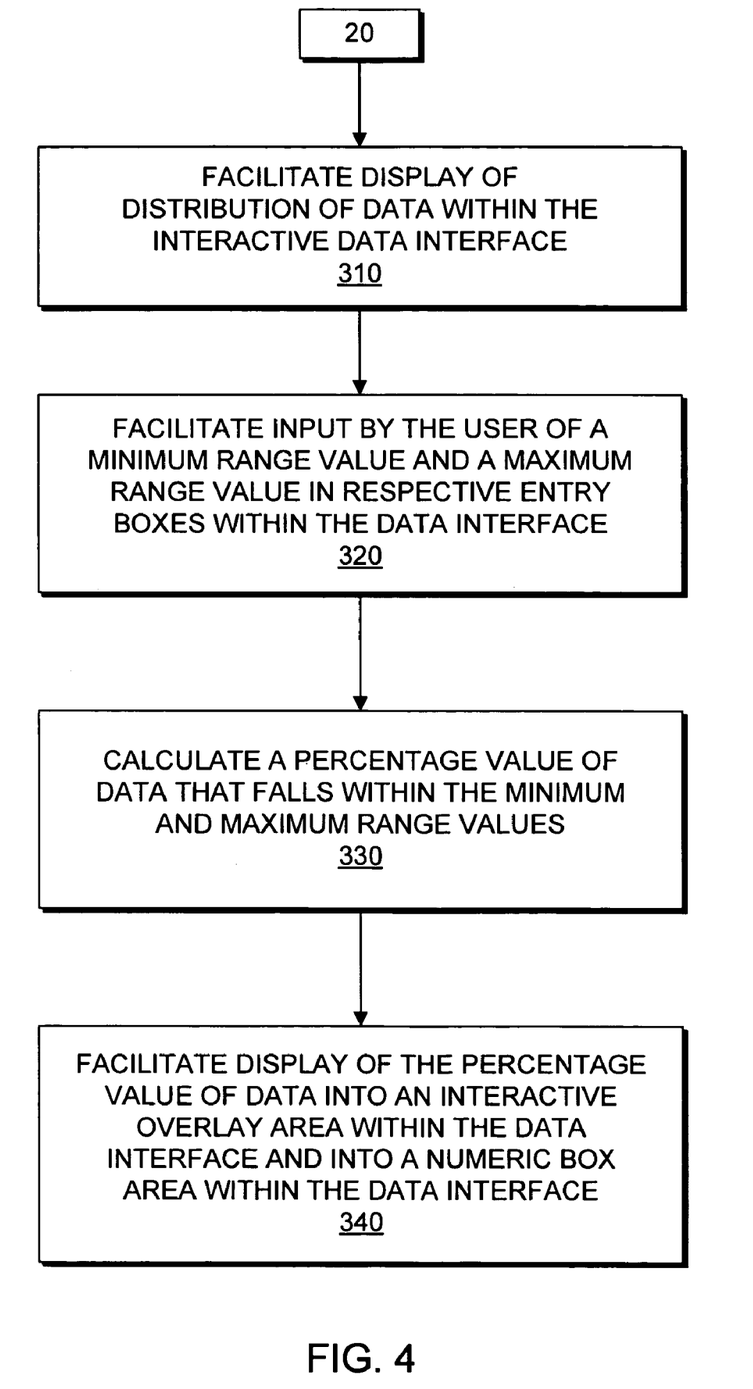
FIG. 4 is a flow diagram illustrating a method to facilitate interactive selection and presentation of datasets, according to one embodiment of the invention.

FIG. 4 is a flow diagram illustrating a method to facilitate interactive selection and presentation of datasets, according to one embodiment of the invention. As illustrated in FIG. 4, subsequent to receipt from a user 140 of a request to display data and presentation of an interactive data interface 200 to the user 140 in a display window of the user's client machine, at processing block 310, display of distribution of data is facilitated within the interactive data interface 200.

In one embodiment, a user 140 accesses the entity 100 either directly or via the network 120 and transmits a request to display data. The interface servers 102 receive the user request and transmit the request to the processing engine 112 within the system 110. The processing engine 112 retrieves the entire set of data from the data storage module 114 and presents an interactive data interface 200 in a display window on the user's client machine via the network 120. The processing engine 112 further populates the box plot area 240 within the data interface 200, specifically the box area 242 and whisker areas 244, with appropriate distribution of data values, including the minimum and maximum values of the data, the bottom and top quartile values, the mean value, and the median value. The processing engine 112 also displays the interactive entry boxes 210, the interactive overlay area 230, and the interactive results area 220 within the data interface 200.

At processing block 320, input by the user 140 of a minimum range value and a maximum range value is facilitated in respective entry boxes 210 within the data interface 200. In one embodiment, the processing engine 112 activates the interactive entry boxes 210, the interactive overlay area 230, and the interactive results area 220 to enable numeric input by the user 140 of the minimum range value and the maximum range value in the respective entry boxes 210.

At processing block 330, a percentage value of data that falls within the minimum and maximum range values is calculated. In one embodiment, the processing engine 112 receives the minimum and maximum range values input by the user 140 and calculates the percentage value of data that falls within the input data range.

Finally, at processing block 340, display of the calculated percentage value of data is facilitated into the interactive overlay area 230 and the interactive results box area 220 within the data interface 200. In one embodiment, the processing engine 112 populates the interactive results area 220 with the calculated percentage value and facilitates display of the transparent overlay area 230 over the box plot area 240 to encompass the percentage value of data requested by the user 140.

Figure 5:
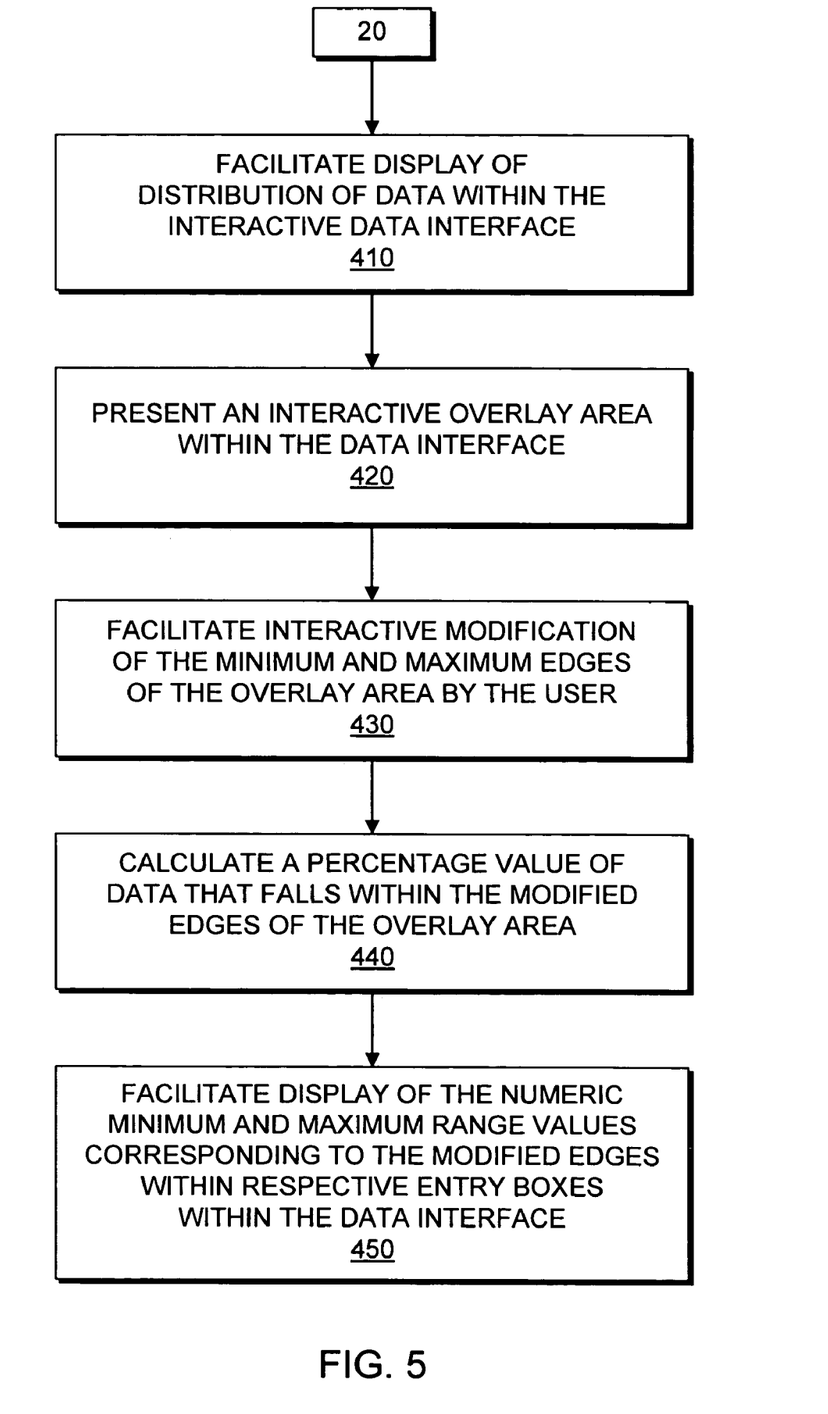
FIG. 5 is a flow diagram illustrating a method to facilitate interactive selection and presentation of datasets, according to an alternate embodiment of the invention.

FIG. 5 is a flow diagram illustrating a method to facilitate interactive selection and presentation of datasets, according to an alternate embodiment of the invention. As illustrated in FIG. 5, subsequent to receipt from a user 140 of a request to display data and presentation of an interactive data interface 200 to the user 140 in a display window of the user's client machine, at processing block 410, display of distribution of data is facilitated within the interactive data interface 200.

In one embodiment, a user 140 accesses the entity 100 directly, or, in the alternative, via the network 120 and transmits a request to display data. The interface servers 102 receive the user request and transmit the request to the processing engine 112 within the system 110. The processing engine 112 retrieves the entire set of data from the data storage module 114 and presents an interactive data interface 200 in a display window on the user's client machine. The processing engine 112 further populates the box plot area 240 within the data interface 200, specifically the box area 242 and whisker areas 244, with an appropriate distribution of data values, including the minimum and maximum values of the data, the bottom and top quartile values, the mean value, and the median value.

At processing block 420, an interactive overlay area 230 is presented within the data interface 200. In one embodiment, the processing engine 112 presents the interactive overlay area 230 within the data interface 200 and positions the overlay area 230 over the box plot area 240. In addition, the processing engine 112 further displays the interactive entry boxes 210, which are adjacent to the boundaries or edges of the interactive overlay area 230, and the interactive results area 220 within the data interface 200.

At processing block 430, interactive modification of the minimum and maximum edges of the interactive overlay area 230 by the user 140 is facilitated. In one embodiment, the processing engine 112 activates the interactive overlay area 230 to enable the user 140 to slide with a conventional mouse click command either one or both of the minimum and maximum edges of the interactive overlay area 230 to communicate a range of data requested by the user 140 from the entire dataset displayed in the box plot area 240.

At processing block 440, a percentage value of data that falls within the minimum and maximum modified edges of the interactive overlay area 230 is calculated. In one embodiment, the processing engine 112 receives the minimum and maximum range values corresponding respectively to the minimum and maximum boundaries or edges modified by the user 140. The processing engine 112 further calculates the percentage value of data that falls within the input data range.

Finally, at processing block 450, display of the numeric minimum and maximum range values corresponding to the modified edges of the interactive overlay area 230 is facilitated within respective interactive entry boxes 210 of the data interface 200. Furthermore, display of the calculated percentage value of data is also facilitated into the interactive results box area 220 within the data interface 200. In one embodiment, the processing engine 112 populates the entry boxes 210 with the respective minimum and maximum range values and further populates the interactive results area 220 with the calculated percentage value.

Figure 6:
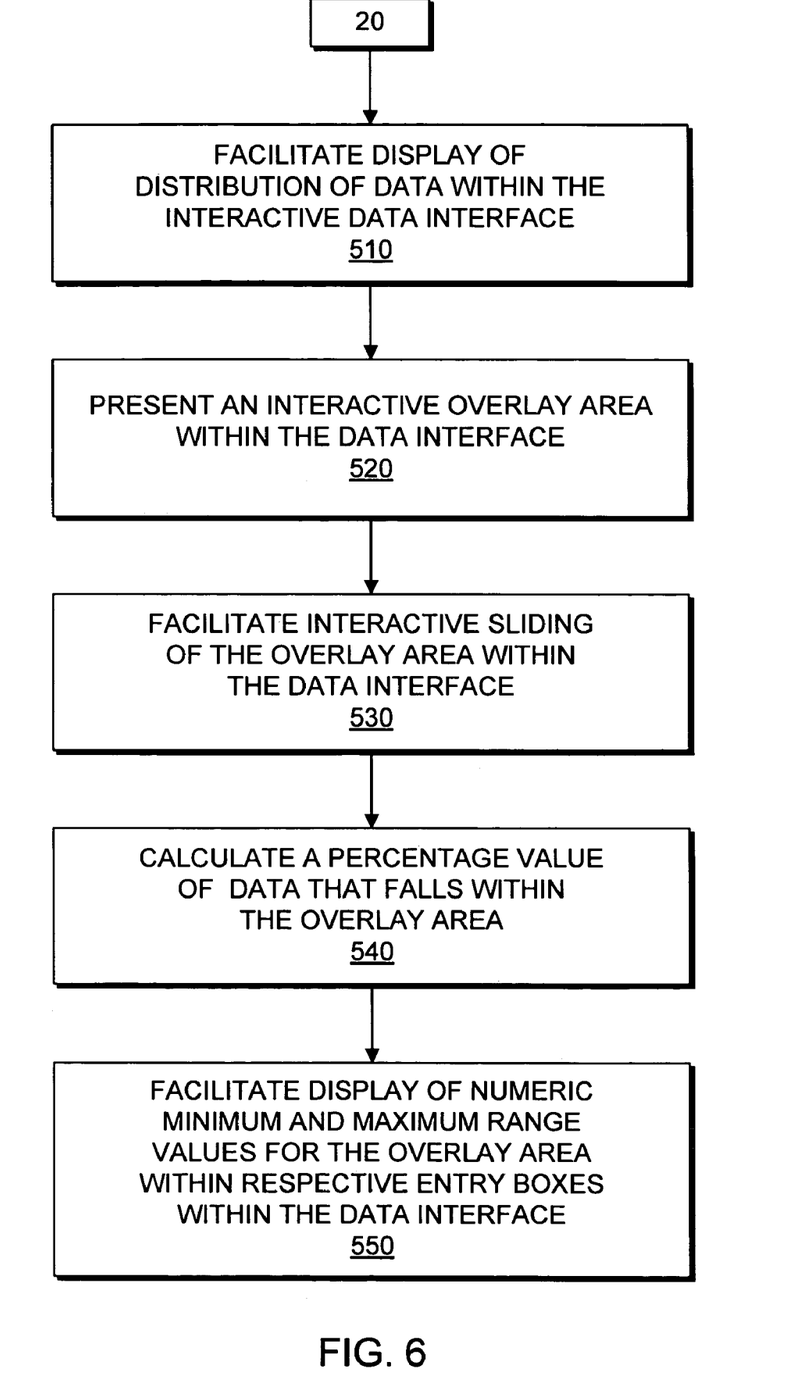
FIG. 6 is a flow diagram illustrating a method to facilitate interactive selection and presentation of datasets, according to another alternate embodiment of the invention.

FIG. 6 is a flow diagram illustrating a method to facilitate interactive selection and presentation of datasets, according to another alternate embodiment of the invention. As illustrated in FIG. 6, subsequent to receipt from a user 140 of a request to display data and presentation of an interactive data interface 200 to the user 140 in a display window of the user's client machine, at processing block 510, display of distribution of data is facilitated within the interactive data interface 200.

In one embodiment, a user 140 accesses the entity 100 directly or, in the alternative, via the network 120 and transmits a request to display data. The interface servers 102' receive the user request and transmit the request to the processing engine 112 within the system 110. The processing engine 112 retrieves the entire set of data from the data storage module 114 and presents an interactive data interface 200 in a display window on the user's client machine. The processing engine 112 further populates the box plot area 240 within the data interface 200, specifically the box area 242 and whisker areas 244, with an appropriate distribution of data values, including the minimum and maximum values of the data, the bottom and top quartile values, the mean value, and the median value.

At processing block 520, an interactive overlay area 230 is presented within the data interface 200. In one embodiment, the processing engine 112 presents the interactive overlay area 230 within the data interface 200 and positions the overlay area 230 over the box plot area 240. In addition, the processing engine 112 further displays the interactive entry boxes 210, which are adjacent to the boundaries or edges of the interactive overlay area 230, and the interactive results area 220 within the data interface 200.

At processing block 530, interactive sliding of the interactive overlay area 230 within the data interface 200 by the user 140 is facilitated. In one embodiment, the processing engine 112 activates the interactive overlay area 230 to enable the user 140 to modify the position of the overlay area 230 with a conventional mouse click command without changing its size. The user 140 slides the entire interactive overlay area 230 over the box plot area 240 of the data interface 200 to communicate a range of data requested by the user 140 from the entire dataset displayed in the box plot area 240.

At processing block 540, a percentage value of data that falls within the minimum and maximum edges of the interactive overlay area 230 is calculated. In one embodiment, the processing engine 112 receives the minimum and maximum range values corresponding respectively to the minimum and maximum boundaries or edges of the overlay area 230. The processing engine 112 further calculates the percentage value of data that falls within the input data range.

Finally, at processing block 550, display of the numeric minimum and maximum range values corresponding to the interactive overlay area 230 is facilitated within respective interactive entry boxes 210 of the data interface 200. Furthermore, display of the calculated percentage value of data is also facilitated into the interactive results box area 220 within the data interface 200. In one embodiment, the processing engine 112 populates the entry boxes 210 with the respective minimum and maximum range values and further populates the interactive results area 220 with the calculated percentage value.

Figure 7:
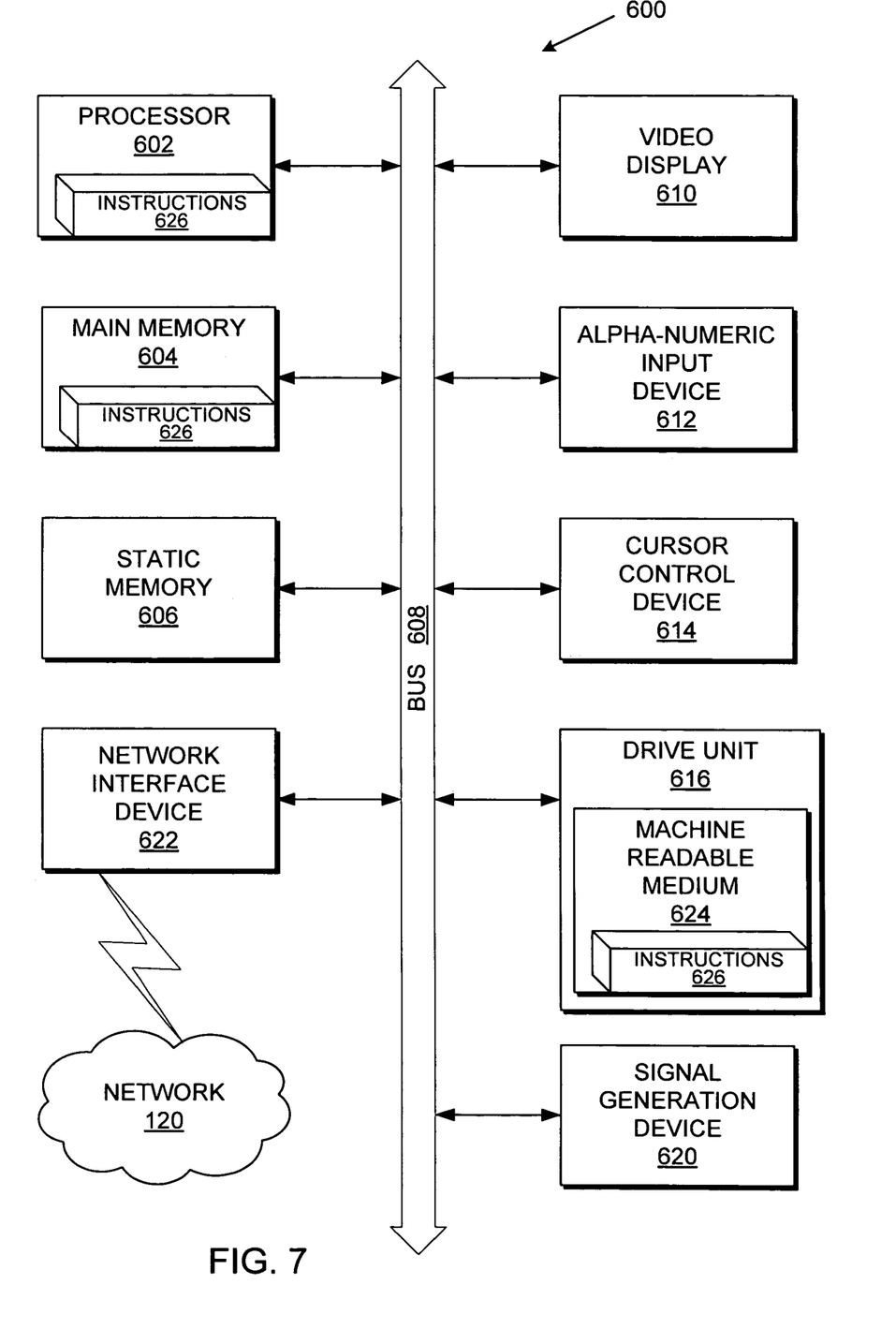
FIG. 7 is a diagrammatic representation of a machine in the exemplary form of a computer system within which a set of instructions may be executed.

FIG. 7 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker), and a network interface device 620.

The disk drive unit 616 includes a machine-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 620.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
    presenting an interactive data interface to a user in a display window, said interactive data interface containing distribution of a dataset accessed by said user;
    receiving a minimum range value and a maximum range value corresponding to a data range within said dataset, said range values being input by said user into at least one interactive area within said data interface;
    presenting an overlay area for said user within said data interface;
    facilitating interactive modification of a position of said overlay area to communicate said data range within said dataset;
    calculating a percentage value of data within said data range defined by modified minimum and maximum edges of said overlay area; and
    facilitating display of data within said data range within said overlay area of said data interface.

2. The method according to claim 1, wherein said presenting further comprises:
    facilitating display of said distribution of data into a box plot area within said data interface.

3. The method according to claim 1, wherein said receiving further comprises:
    facilitating numeric input of said minimum range value and said maximum range value into respective entry boxes within said data interface; and
    calculating a percentage value of data within said data range defined by said minimum range value and said maximum range value.

4. The method according to claim 3, further comprising:
    facilitating display of said percentage value into a numeric box area within said data interface.

5. The method according to claim 1, wherein facilitating interactive modification further comprises:
    facilitating interactive modification of at least one of a minimum edge and a maximum edge of said overlay area to communicate said data range within said dataset.

6. The method according to claim 5, further comprising:
facilitating display of said percentage value into a numeric box area within said data interface.

7. A system comprising:
a data storage module to store a dataset accessible to a user; and
a processing engine coupled to said data storage module, said processing engine to present an interactive data interface to said user in a display window, said interactive data interface containing distribution of said dataset accessed by said user, to receive a minimum range value and a maximum range value corresponding to a data range within said dataset, said range values being input by said user into at least one interactive area within said data interface, to present an overlay area for said user within said data interface, to facilitate interactive modification of a position of said overlay area to communicate said data range within said dataset, to calculate a percentage value of data within said data range defined by modified minimum and maximum edges of said overlay area and to facilitate display of data within said data range within said overlay area of said data interface.

8. The system according to claim 7, wherein said processing engine further facilitates display of said distribution of data into a box plot area within said data interface.

9. The system according to claim 7, wherein said processing engine further facilitates numeric input of said minimum range value and said maximum range value into respective entry boxes within said data interface and calculates a percentage value of data within said data range defined by said minimum range value and said maximum range value.

10. The system according to claim 9, wherein said processing engine further facilitates display of said percentage value into a numeric box area within said data interface.

11. The system according to claim 7, wherein said processing engine further facilitates interactive modification of at least one of a minimum edge and a maximum edge of said overlay area to communicate said data range within said dataset.

12. The system according to claim 11, wherein said processing engine further facilitates display of said percentage value into a numeric box area within said data interface.

13. A computer readable medium containing executable instructions, which, when executed in a processing system, cause said processing system to perform a method comprising:

presenting an interactive data interface to a user in a display window, said interactive data interface containing distribution of a dataset accessed by said user;
receiving a minimum range value and a maximum range value corresponding to a data range within said dataset, said range values being input by said user into at least one interactive area within said data interface;
presenting an overlay area for said user within said data interface;
facilitating interactive modification of a position of said overlay area to communicate said data range within said dataset;
calculating a percentage value of data within said data range defined by modified minimum and maximum edges of said overlay area; and
facilitating display of data within said data range within said overlay area of said data interface.

14. The computer readable medium according to claim 13, wherein said presenting further comprises:
facilitating display of said distribution of data into a box plot area within said data interface.

15. The computer readable medium according to claim 13, wherein said receiving further comprises:
facilitating numeric input of said minimum range value and said maximum range value into respective entry boxes within said data interface; and
calculating a percentage value of data within said data range defined by said minimum range value and said maximum range value.

16. The computer readable medium according to claim 15, wherein said method further comprises:
facilitating display of said percentage value into a numeric box area within said data interface.

17. The computer readable medium according to claim 13, wherein facilitating interactive modification further comprises:
facilitating interactive modification of at least one of a minimum edge and a maximum edge of said overlay area to communicate said data range within said dataset.

18. The computer readable medium according to claim 17, wherein said method further comprises:
facilitating display of said percentage value into a numeric box area within said data interface.

* * * * *